United States Patent Office 3,294,386
Patented Dec. 27, 1966

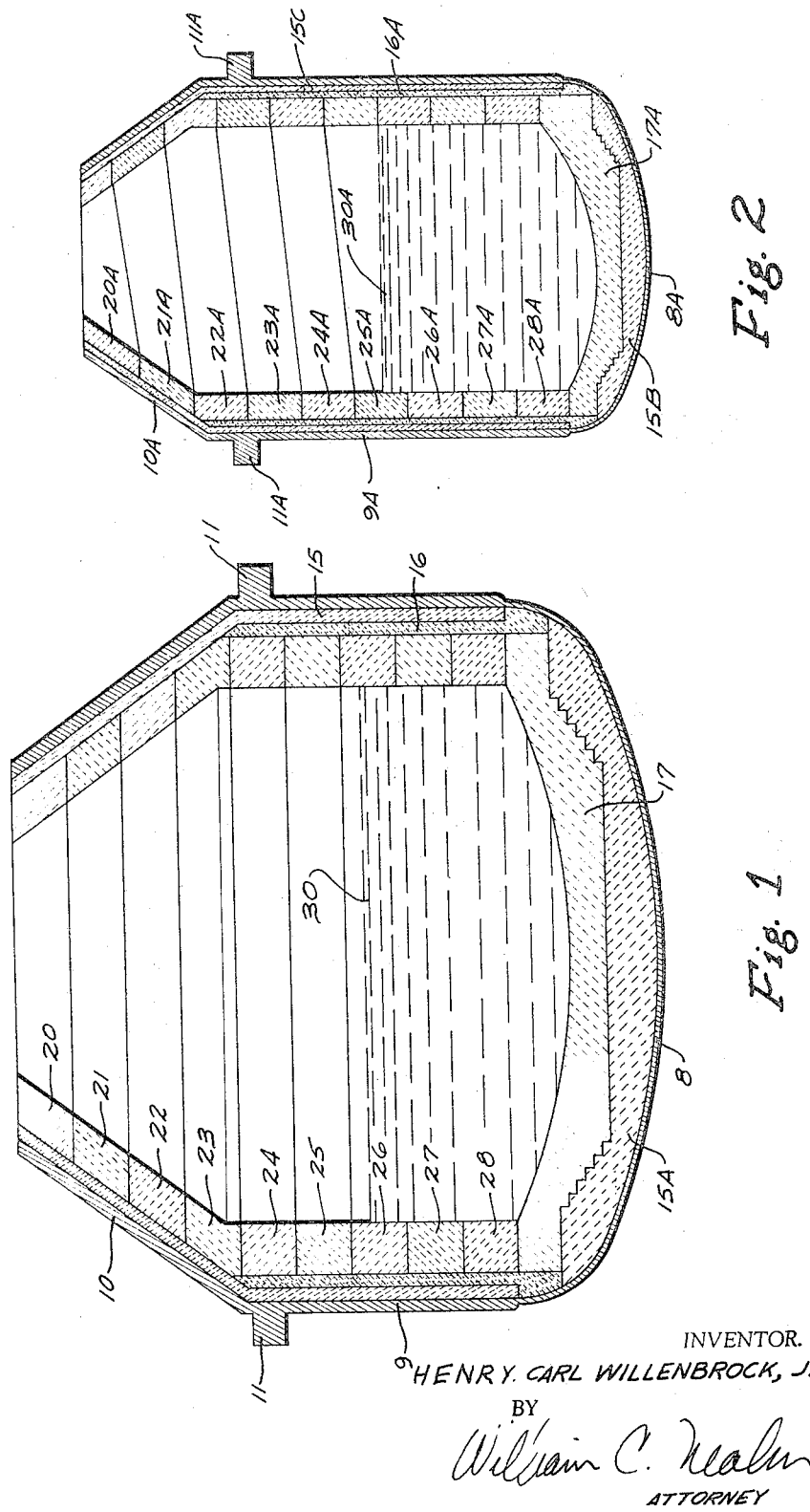

3,294,386
OXYGEN CONVERTER LININGS
Henry Carl Willenbrock, Jr., Pittsburgh, Pa., assignor to Harbison-Walker Refractories Company, Pittsburgh, Pa., a corporation of Pennsylvania
Filed Mar. 12, 1964, Ser. No. 351,365
8 Claims. (Cl. 266—36)

This invention relates to furnace structure for the oxygen steelmaking process. More particularly, this invention relates to the composition of the working lining for such structures.

In the oxygen steelmaking process, which has been variously designated as the LD process, oxygen Bessemer process and the oxygen converter process, the furnace structure fundamentally consists of a metal shell having a refractory lining disposed therein. The lining for oxygen steel furances has heretofore usually been rather simple, consisting of an inner or "working lining" of tar bonded, chemically bonded or burned basic brick, an exterior or tank lining of burned magnesite brick and, usually, an intermediate layer of a tar bonded ramming mix of composition similar to that of the working lining. In an article in the July 7, 1958, issue of "Steel" magazine by J. P. Holt, entitled "Tar Bonds Oxygen Vessel Bricks," the foregoing practices are described in some detail.

During the evolution of the oxygen converter process, which is of contemporary and quite recent origin in the United States, many different materials have been tried for the working linings, with varying degrees of success, in attempts to obtain longest possible service life, or at least service life which is economical as calculated in cost of the refractory per ton of steel produced. Because these oxygen steelmaking processes operate with a chemically basic slag, the art has appeared to almost uniformly recognize the necessity of fabricating the working lining entirely of chemically basic refractory materials, principally dead burned dolomite and dead burned magnesite or magnesia (we use these latter two terms synonymously), with minor amounts of hard burned lime, in a variety of forms and combinations. When we refer to "dead burned" dolomite or magnesite herein, we mean to describe the material as being a product of a process which includes heating to an elevated temperature, normally above 3000° F., to produce refractory oxides of relatively stable and dense character as compared to the progenitor core or lightly calcined varieties of dolomite and magnesite. Of course, it is recognized that dolomite occurs in many forms in nature, but it is essentially a combination of the carbonates $MgCO_3$ and $CaCO_3$. The ASTM definition of refractory dolomite requires that these two carbonates be present in about a 1:1 molar ratio. It should, of course, be understood, then, that it is possible to manufacture synthetic dolomites or dolomitic material. This could be done, for example, according to the teachings of the United States patent to Leatham et al., 3,060,042, entitled "Production of Dead Burned Grain," simply by balancing the amounts of magnesia and calcia starting materials which are subjected to the process disclosed and claimed in that patent.

Although many and varied types of lining materials have been tried in atempts to improve the service life of the working lining, the general practice appears to at least temporarily have settled on either making the whole working lining of one material (as, for example, discussed in the Holt article, above cited) or else to fabricate a so-called zoned lining. An exemplary zoned lining, which has shown considerable success in actual service is that disclosed in my copending application, Serial No. 132,788 now Patent Number 3,148,238, entitled "Oxygen Converter Linings." This application is owned by a common assignee. However, even this lining has had some difficulty in shorter and squatter vessels, although it has provided an amazing increase in service life as compared to prior ones of the type, for example, disclosed and described in the same Holt article, above noted. When I say shorter and squatter, I mean, for example a vessel which is almost as wide or wider than it is high; for example, one 30 to 35 feet in diameter and 30 to 35 feet in heighth. At present I know of no vessel in which the width exceeds the heighth, but some come fairly close.

As is well known to those skilled in this art, numerical dimensions from one converter vessel to the next are widely variant. The present invention has utility in vessels other than the short and squat ones, but it has been particularly successful in these.

One of the difficulties which has been encountered in these shorter and squatter vessels is erosion of the working lining, usually just below the cone section where the barrel zone and cone section join, due to contact with high temperature, extremely corrosive, dust-laden fumes and flue gases. In some instances, this erosion has caused a vessel to come off the line, even though the cone section still had service life remaining. The present invention not only considerably reduces the destructive effects, just mentioned, but appears to also provide increased ability of the lining to resist the stresses and strains encountered in vessel operation. These stresses and strains are caused by the physical movement and manipulation of the vessel or furnace itself during the steelmaking operation, due to wide and cyclic variation in temperature, due to successive charging and tapping heats of metal from the vessel, etc. It, also, appears to be adequately resistant to the violent and corrosive slag splash which results when high pressure oxygen is blown into or onto the molten metal bath in a vessel.

Briefly, according to one aspect of this invention, I provide a novel zoned working lining for an oxygen converter furnace. The lining is, in essence, comprised of alternating rings of specially selected tar bonded and ceramically bonded tar impregnated, basic refractory shapes. This zoned ring construction extends at least from the dish-shaped bottom of the vessel to the top opening from the cone section. For smaller vessels, instead of alternating rings or courses, I use a double or even quatenary spiral construction with alternate spirals of burned tar impregnated, and unburned tar bonded, basic refractory brick.

This alternating ring or course construction appears to combine favorable properties of each of the burned and unburned varieties of brick and to, in some manner, allow them to synergistically coact to overcome what have been previously considered undesirable physical aspects of each.

A better understanding and further features of lining construction, according to the concepts of this invention, will become readily apparent to refractory technologists and those skilled in the metallurgical arts from a study of the following detailed description together with reference to the drawings. In these drawings:

FIG. 1 is a schematic side elevation of an oxygen converter vessel having a working lining constructed according to the concepts of this invention; and FIG. 2 is an alternative lining construction of the spiral type which also embodies the concepts of this invention.

In the copending application of King et al., Serial Number 266,796, now Patent Number 3,141,784, entitled "High Temperature Refractory" (which is, in turn, a continuation-in-part of an earlier filed application of the same title and inventorship, Serial Number 38,438, which earlier filed application has now been abandoned), there is disclosed a unique, tar bonded, lime-magnesite brick composition. A primary object of the King et al. application is to provide a tar bonded brick or shape composed of grain of at least about 96% combined magnesite (MgO) and lime, or calcia (CaO), which has maximum resistance to the siliceous early slag produced in an oxygen converter operation. In another copending application, Serial Number 108,989, now Patent Number 3,141,785, entitled "Refractory Shapes," by Davies, there is disclosed and claimed a unique, tar bonded composition similar to that disclosed and claimed in the King et al. application, which has particular resistance to the iron oxide ($Fe_2O_3$) which is present in the oxygen converter slag at all times, but which is particularly high in the late slag. The following are typical analyses of the early and late slags just referred to, and are believed useful to a better understanding of the scope and depth of the problems of fabricating basic refractory compositions and linings which resist destruction by the oxygen converter process.

|  | Early slag, percent | Late slag, percent |
|---|---|---|
| Silica ($SiO_2$) | 32.1 | 18.1 |
| Lime (CaO) | 40.9 | 36.0 |
| Iron Oxide ($Fe_2O_3$) | 11.5 | 30.5 |
| Manganese Oxide (MnO) | 6.9 | 6.7 |
| Magnesia (MgO) | 5.7 | 5.7 |
| Titania ($TiO_2$) | 1.4 | 1.4 |
| Phosphorous Pentoxide ($P_2O_5$) | | |

These tar bonded brick of King et al. and Davies are the preferred tar bonded brick to be used in fabrication of the zoned lining herein disclosed and claimed. In the copending application of Davies et al., entitled "Oxygen Steelmaking," Serial Number 254,013, now Patent Number 3,141,790, there is disclosed and claimed a ceramically bonded, tar impregnated chemically basic refractory brick which I prefer to use in the construction of my zoned lining. A very good ceramically bonded basic refractory brick, which can be tar impregnated and used according to this invention, is also disclosed and claimed in the King et al. application, Serial Number 266,796, above identified. Still further, another very satisfactory tar bonded basic refractory composition which can be used according to the concepts of this invention is described and claimed in the copending application of Duncan, entitled "Oxygen Converter Linings," Serial Number 226,719, now Patent Number 3,141,917. All of the foregoing applications are owned by a common assignee.

Typical data on the composition of the various tar bonded and tar impregnated basic refractory shapes, above disclosed are as follows (in the table the composition is identified by the serial number of the respective copending applications, the subject matter of which is herein incorporated by reference):

| Serial Number | Composition |
|---|---|
| King, Serial Number 266,796 (tar bonded). | 5 to 50% CaO, 50-94% MgO, no more than 4% $SiO_2$, $Al_2O_3$, and $Fe_2O_3$. |
| King, Serial Number 266,796 (tar impregnated). | 5-10% CaO, 95-90% MgO, any remainder $SiO_2$, $Al_2O_3$ and $Fe_2O_3$ in an amount not over 4%. |
| Davies, Serial Number 108,989 (tar bonded). | 50-5% CaO, 60-94% MgO, 1-5% $Cr_2O_3$, any remainder $SiO_2$ $Al_2O_3$ and $Fe_2O_3$, in an amount not over 4%. |
| Davies, Serial Number 254,013 (tar impregnated). | About 96-97% MgO, CaO and $SiO_2$ in a weight ratio between 3 to 1 and 4 to 1, and no more than about 1% of $Cr_2O_3$, $Al_2O_3$ and $Fe_2O_3$. |
| Duncan, Serial Number 226,719 (tar bonded) | Substantially the same as Davies 254,013, except CaO to $SiO_2$ weight ratio exceeds 2 to 1, but the CaO content is no more than 5%. |

An oxygen converter vessel, in essence, consists of three interconnected exterior metal shell parts, which are lined with refractory. The refractory lining, in general, follows the internal contour of these metal shell sections. These shell sections are comprised of an upwardly opening, generally dish-shaped, concave bottom shell 8, a cylindrical barrel section 9 which extends from the bottom 8 to the generally truncated conical cone section 10. Lugs 11 are provided at about the upper extremity of the barrel 9, whereby the furnace can be attached or connected with a trunnion ring (not shown) or the like so it can be moved and tilted or the like for charging and discharging operations.

A shell, tank, or safety lining 15 is provided. Today it is usually of a ceramically bonded periclase brick but can be of other materials. Usually a tar bonded, rammed basic refractory back-up section 16 separates the tank lining 15 from the inner working lining. This back-up lining 16 can be of almost any basic refractory material, but it usually consists of refractory of about the same character as the working lining.

For the bottom, the shell lining 15A can be the same as the shell lining 15, as desired. The working lining 17, which covers the dish-shaped bottom, can be substantially any tar bonded basic refractory material of conventional character. When I speak of a conventional basic refractory, a mean a refractory product which is basic in character, without regard to the remainder of the composition. It can be tar bonded material selected from the group dead burned dolomite, dead burned magnesite, and hard burned lime (for example, of the types discussed in the Holt article). If desired, it can be tar impregnated, conventional, basic refractory brick. I prefer to use a tar bonded material of the type disclosed and claimed in the King et al. application, Serial No. 38,438. The remainder of the vessel, including both the cone section and the barrel zone, are lined with alternating courses or rings of tar bonded and ceramically bonded, tar impregnated refractories selected from the various ones above noted. I prefer that the uppermost course 20, which extends about the peripheral lip of the cone outlet, be a tar impregnated one. Thus, ring 21 is tar bonded, ring 22 is tar impregnated, ring 23 is tar bonded, ring 24 is tar impregnated, ring 25 is tar bonded, ring 26 is tar impregnated, ring 27 is tar bonded, and ring 28 is tar impregnated.

A given ring or course of the group 20 through 28 can run from 3" to 9", for example, in vertical extent. The thickness of all of the rings, i.e. measuring from the interior of the vessel to the respective backup portions, conventionally runs from about 13 to about 27". The numeral 30 is used to generally designate a bath of molten metal in the vessel. We have exaggerated its depth for purposes of explanation. In today's practice the bath is ½ to ⅓ the depth shown in the scale of the drawings.

With the foregoing working lining in an actual vessel service installation, a record for that vessel was set; whereas, previous linings had been of the type disclosed and claimed in copending application Serial No. 132,788, in which upwards of 200 heats were accomplished (this being about tiwce what has been accomplished with the straight tar bonded working linings); with a lining according to this invention, of the general type shown in FIG. 1, 270 heats were accomplished. When the vessel came off the line, the working lining had an undulating somewhat washboard appearance with valleys of greater wear around each tar bonded ring, and ridges where the tar impregnated rings were present.

In FIG. 2, there is shown an alternative construction. The vessel is comprised of the three interconnected outer shell sections 8A, 9A and 10A, similar in all respects to like parts in FIG. 1, and having lugs 11A which are similar to lugs 11 of FIG. 1. The tank lining 15C is of composition similar to the tank lining 15. The intermediate backup lining 16A is similar to the corresponding backup 16 in FIG. 1. Tank lining 15B is similar to 15A of FIG. 1, as is the working lining 17A acrosss the bottom similar to the bottom working lining 17 of FIG. 1. A bath of molten metal 30A is schematically indicated. Alternating tar bonded and tar impregnated courses have been given numbers similar to those in FIG. 1, adding the letter "A" to distinguish them. The only difference between the two working lining constructions is that, in FIG. 1, generally horizontally disposed rings or courses are used; whereas, in FIG. 2, these courses are laid up in spiral form. I have shown single spirals; but, of course, it could be double or triple, i.e. two or three tar impregnated brick could start one spiral, two or three tar bonded ones could form the subsequent spiral, etc. Still further, it should be understood that the spirals usually are continuous from the bottom to the top of the vessel; and that the apparent indication of alternating rings, shown in FIG. 2, is because it is a sectional view. For example, zones 20A, 22A, 24A, 26A and 28A are all part of a single continuous spiral. The spiral construction is used in narrower vessels because considerably fewer key shapes are necessary than if separate, generally horizontal rings were constructed. One could use the spiral construction in larger vessels and obtain the benefits of this invention, but I ordinarily prefer the ring construction for these. When I mention "smaller" diameter, I mean less than 20', perhaps as low as 14' in diameter. Still further, the spirals need not go to the very top of the vessel. They can be stopped at about the cone. The cone can be a new spiral or it could be a ring structure of the type shown in FIG. 1.

With a working lining zoned in the manner disclosed above, greater refractory life is more easily accomplished. This increased life is attained because of the manner in which the tar bonded and tar impregnated brick coact. For example, the tar impregnated, ceramically bonded brick are more highly resistant to the physical erosion and washing away of the very hot, swirling, dust-laden gases evolving from the vessel operation. The tar bonded ones, because they are much less rigid than the ceramically bonded ones and, thus, are considerably more elastic and able to take compressive load, allow for the expansion and contraction of the more rigid ceramically bonded, tar impregnated brick during cyclic variation in temperature, as is encountered during the charging, tapping and melting of metal in the vessel.

All percentages set forth in this specification are, by weight, unless otherwise indicated. All chemical analyses are, by weight, on an oxide basis, in conformity with the conventional practices of reporting chemical content of refractories.

My preferred embodiment of lining construction according to this invention uses tar impregnated brick of the type disclosed and claimed in Davies, Serial No. 254,013; and the tar bonded ones are of the type disclosed and claimed in Duncan, Serial No. 226,719.

Using my zoned lining construction, if one so desires, it is possible to use less pure, tar bonded refractories. For example, in those having as low as a 90% MgO content, the total MgO+CaO could run on the order of at least about 92%, the remainder would be the sesquioxides $Fe_2O_3$, $Cr_2O_3$, and $Al_2O_3$, and $SiO_2$.

Having thus described the invention in detail and with sufficient particularity as to enable those skilled in the art to practice it, what is desired to have protected by letters patent is set forth in the following claims.

I claim:

1. An oxygen converter furnace comprising a metal vessel having a mouth at its top, a shell protective lining in contact with the inside surface of said vessel and a working lining having a surface exposed to the interior of said vessel, said working lining constructed of three major zones, these three zones being the bottom zone, the barrel zone and the cone section zone, the bottom zone being generally disc-shaped and of upwardly opening concave configuration, the barrel zone extending from the dish-shaped bottom upwardly to the cone section zone, the barrel zone being of substantially uniform cross sectional dimension from the bottom zone to the cone section zone, the cone section zone being of downwardly opening truncated cross section configuration, the bottom zone portion of the working lining being fabricated of tar bonded basic refractory, the working lining extending from the bottom zone upwardly substantially the full extent of the barrel zone to the cone section zone, when viewed in vertical cross section, being constructed of alternating courses of tar bonded and tar impregnated chemically basic refractory shapes, the tar bonded shapes being fabricated of refractory material of the group hard burned lime, dead burned dolomite and dead burned magnesite, the ceramically bonded tar impregnated shapes being fabricated of refractory material analyzing at least about 95% MgO+CaO and selected from the group consisting of hard burned lime, dead burned dolomite and dead burned magnesite, there being no more than about 4% of $SiO_2$, $Al_2O_3$ and $Fe_2O_3$ in said ceramically bonded tar impregnated refractory shapes, and a final course about the peripheral lip of the open top of the furnace being fabricated of said ceramically bonded tar impregnated basic refractory.

2. The converter vessel working lining of claim 1 in which the tar bonded refractory of the barrel zone and cone section zone is made of refractory material analyzing from 5 to 50% CaO, from 50 to 94% MgO, the remainder being $SiO_2$, $Al_2O_3$ and $Fe_2O_3$.

3. The oxygen converted vessel working lining of claim 1 in which the tar impregnated shapes analyze 5 to 10% CaO, 95 to 90% MgO, the remainder being $SiO_2$, $Al_2A_3$ and $Fe_2O_3$.

4. The oxygen converter vessel working lining of claim 1 in which the tar bonded refractory analyzes 50 to 5% CaO, 50 to 94% MgO, 1 to 5% $Cr_2O_3$, the total $CaO+MgO+Cr_2O_3$ content, on an oxide basis, being at least about 96%, the remainder being $SiO_2$, $Al_2O_3$ and $Fe_2O_3$.

5. An oxygen converter vessel working lining according to claim 1 in which the ceramically bonded tar impregnated refractory analyzes about 96 to 97% MgO and there is present CaO and $SiO_2$ in a weight ratio between about 3 to 1 and about 4 to 1, the remainder consisting essentially of material of the group $Cr_2O_3$, $Al_2O_3$ and $Fe_2O_3$, in an amount not exceeding 1%, by weight, of the refractory.

6. An oxygen converter vessel working lining according to claim 1 in which the tar bonded refractory analyzes at least about 95% MgO, there being CaO and $SiO_2$ in a weight ratio which exceeds 2 to 1, said CaO content being no more than about 5%.

7. An oxygen converter vessel working lining according to claim 1 in which the tar impregnated and tar bonded courses are laid up as superposed continuous spirals which extend from the dish-shaped bottom of the vessel to the open top of the cone section zone.

8. An oxygen converter vessel working lining according to claim 1 in which the tar impregnated and tar bonded courses are laid up as superposed, substantially parallel rings.

References Cited by the Examiner

UNITED STATES PATENTS

| | | | |
|---|---|---|---|
| 2,606,017 | 8/1952 | Longenecker | 52—408 |
| 2,901,990 | 9/1959 | Hutter | 110—99 |
| 3,134,199 | 5/1964 | Scheffer | 52—612 |

JOHN F. CAMPBELL, *Primary Examiner.*

J. M. ROMANCHIK, JR., *Assistant Examiner.*